Aug. 30, 1932.  G. M. TAYLOR ET AL  1,875,290
MERCHANDISE AND SHIPPING TAG
Filed Feb. 8, 1932
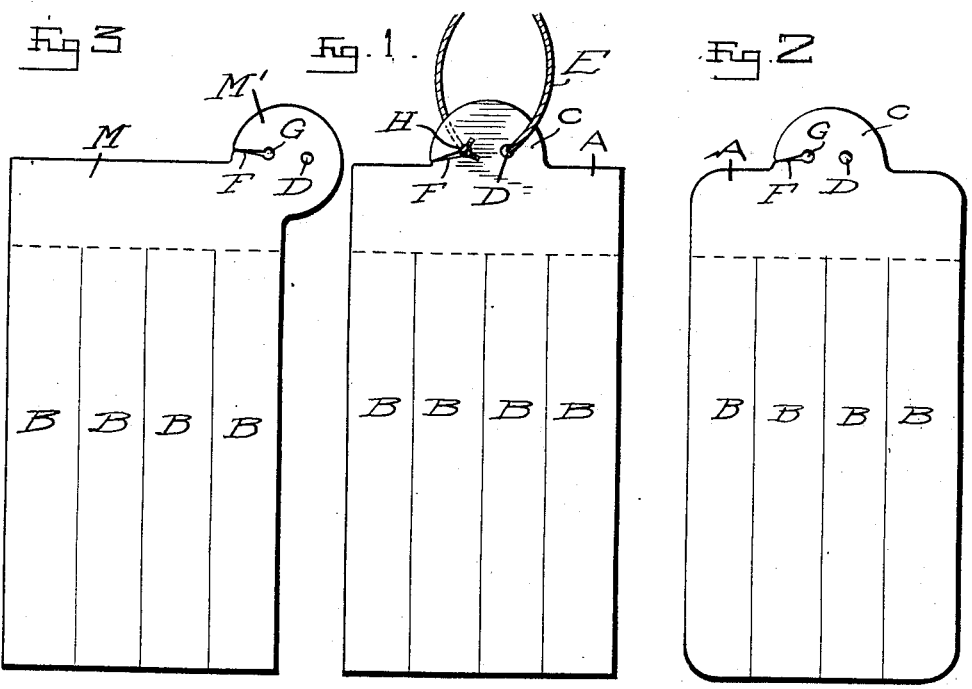
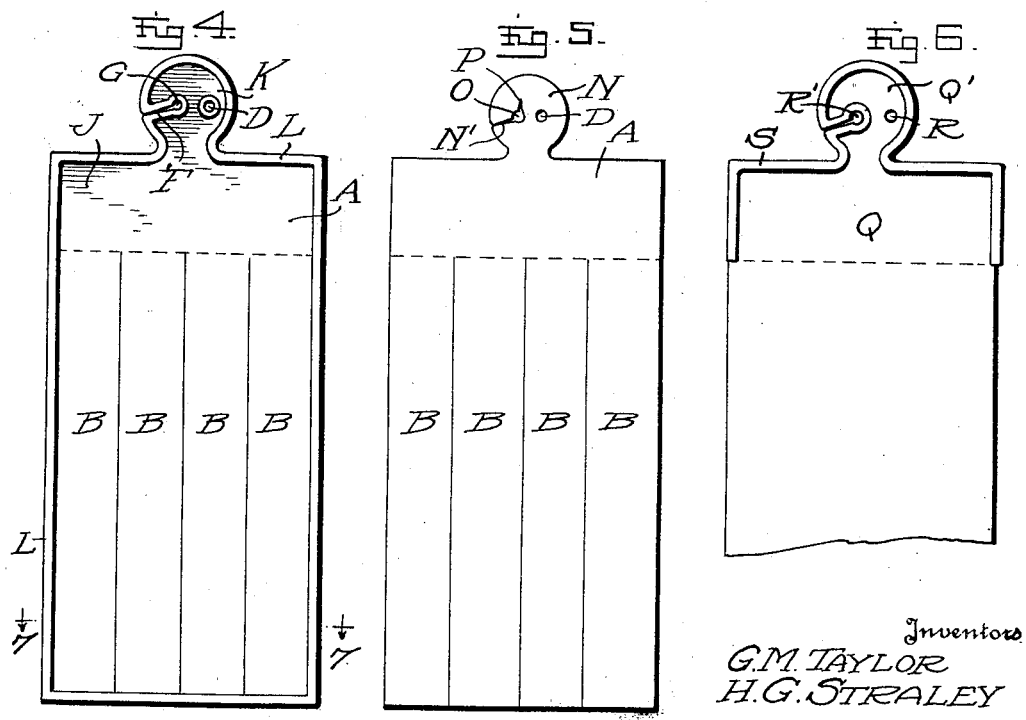
Inventors
G. M. TAYLOR
H. G. STRALEY Patented Aug. 30, 1932

1,875,290

UNITED STATES PATENT OFFICE

GEORGE MORTON TAYLOR AND HAROLD GILBERT STRALEY, OF SARATOGA, INDIANA

MERCHANDISE AND SHIPPING TAG

Application filed February 8, 1932. Serial No. 591,698.

Our invention relates to improvements in merchandise and shipping tags, and one object of our invention is the provision of a tag which will answer the two fold purpose of a tag to be used in connection with merchandise or goods, or which will provide a most useful and desirable tag for use upon packages to be shipped by freight or express.

Another object of our invention is the provision of a tag which may be made in any size to suit the purpose for which it is intended and which is particularly desirable for the use of jewelers or watchmakers because it will carry the full and complete information and record of repairs or work and which can be instantly applied and removed but which will not become accidentally detached.

Another object of our invention is the provision of a tag of the character and for the purposes stated which can be instantly attached and removed and which thus saves a great amount of valuable time and which can be made very cheaply to give the tag the requisites of cheapness, efficiency, usefulness and practical value.

With these objects in view our invention consists of a merchandise or shipping tag embodying novel features of construction and arrangement of parts, substantially as described and claimed and as shown in the accompanying drawing, in which:

Figure 1 represents a plan or face view of a merchandise and shipping tag constructed in accordance with and embodying our invention.

Figure 2 represents a similar view of the tag shown in Figure 1, with the attaching cord removed.

Figures 3, 4, 5 and 6 represent plan or face views of modified constructions of our tag, and Figure 7 represents a sectional view on line 7—7 of Figure 4, to show the tag proper and the binding or border.

In accordance with our invention and as shown in Figures 1 and 2 the tag A, is provided with the series of spaces B, to receive the name, address, date of reception of the work or repair and the date when the work is to be completed, while projecting up from one edge is the ear C, provided with an opening D, to receive one end of the attaching cord E, and upon its opposite edge provided with a slit F, forming a passage for the other end of the attaching cord, which slit terminates or leads to the enlarged opening G, which serves to retain the head or knot H, upon the other or free end of the attaching cord, as shown most clearly in Figure 1.

This form of our tag is particularly desirable for the use of jewelers, opticians, watchmakers, and in fact any merchant engaged in the business of repair work, and also for merchants selling dresses, coats, garments and the like where the tag could be instantly applied by passing the cord through an opening or passage in the article and the free end then slipped into the slit and seated with its knot or head in the opening of the ear of the tag.

In the form of our invention shown in Figure 4, which provides a strong and durable tag suitable for shipping purposes, the tag proper J, with its ear K, is entirely surrounded by the binder or border L, constructed as shown in Figure 7, which tag embodies all the features of the tag shown in Figures 1 and 2 with the reinforcing border or binder.

In the form of our tag shown in Figure 3, the tag M, is provided with an ear M', at one corner and this form of tag will prove useful for many purposes as the location of the ear makes it very easy to attach the tag and to display the face of the tag in easy and ready vision.

In the form shown in Figure 5, the ear N, is provided with the slit N', the opening O, and with the notch or recess P, which serves to lock and bind the end of the attaching cord contiguous with its head when the cord is in position for use, or in attached position.

In the form of our tag shown in Figure 6, the tag Q, has the ear Q', provided with the opening R and R', and is also provided with the border or binders only around one end and said ear, the manner of using being the same as in the other forms of our invention.

It will be understood that the tag is made of a suitable flexible material, and that as shown the cord retaining slot is relatively narrow extending inwardly from an edge of said tag and is defined by walls converging substantially to a point at said edge, the purpose of which is to confine and retain the end of the cord from accidental detachment from the tag.

We claim:

1. A merchandise and shipping tag made of suitable flexible material having an opening to allow the passage of an attaching cord and having a relatively narrow slot extending inwardly from an edge of said tag and defined by walls converging substantially to a point at said edge.

2. A merchandise and shipping tag made of suitable flexible material having an opening to allow the passage of an attaching cord and having a relatively narrow slot extending inwardly from an edge of said tag and defined by walls converging substantially to a point at said edge, and a border around the edge of the tag and slot for reenforcing said tag and slot.

In testimony whereof, we affix our signatures.

GEORGE MORTON TAYLOR.
HAROLD GILBERT STRALEY.